2,886,494

PROCESS FOR INHIBITING THE POLYMERIZATION OF α-CHLORACRYLATE ESTERS AND THE RESULTANT COMPOSITIONS

Harry D. Anspon, Easton, Pa., assignor to General Aniline & Film Corporation, New York, N.Y., a corporation of Delaware No Drawing. Application May 1, 1957
Serial No. 656,192

20 Claims. (Cl. 202—57)

This invention relates to improvements in the manufacture, processing and treatment of polymerizable unsaturated halogen-containing organic compounds and in particular, to α-chloracrylic acid esters and derivatives thereof. Specifically, this invention relates to improvements whereby the handling of such monomeric materials is facilitated during processing and treatments thereof involving the application of heat and other polymerization aids.

The esters of α-chloracrylic acid, and particularly the lower alkyl esters such as methyl, ethyl, propyl, isopropyl, butyl and the like have become increasingly important base materials useful in the manufacture of polymers, which polymers are possessed of outstanding, unusual and unexpected properties. Among the various properties of such polymeric materials are those outstanding physical properties of high heat distortion temperature, high flexural and tensile strength, excellent craze resistance, low notch sensitivity, unique self-extinguishing characteristics in burning tests and complete formability which make these polymers particularly suited for use as a glazing material, especially for the glazing of high-speed aircraft. Among the well known chemical properties of the monomers from which these polymeric materials are prepared is the extreme sensitivity and reactivity of the highly purified monomer to polymerization. In order to prepare a polymer suitable for use as a glazing material and which will be characterized by the above described advantageous physical properties and, in addition, have the desirable and absolutely necessary opitcal characteristics, it has been discovered that the monomer, before it is subjected to polymerizing conditions to form the final product, must be in an exceptional state of purity otherwise one or several of the above described physical characteristics will suffer thereby. In addition, if the monomer is not handled with the utmost care, and if purification is not carried out to the utmost degree, there will arise in the final shaped polymer, or in the polymer subjected to deforming operations in the making of glazing materials such as canopies and the like, the formation of undesirable color bodies or udesirable bubble formation. It is thus of paramount importance to conduct the preparation of the monomer under the most stringent of conditions in order to successfully attain and achieve the utmost in desirable physical and chemical properties in the final polymer.

In carrying out the necessary processing involving purification of the various monomers contemplated, such techniques as distillations are necessary. These distillations involve, under the most desirable conditions, the application of considerable quantities of heat to the monomer in order to effect the necessary separation of impurities from the monomer. These necessary distillation steps, even when carried out at relatively low temperatures where the "pot" temperature is of the order of 50° C., result in rather large losses of the initial charge due to the premature polymerization of the monomer in the pot. In the absence of any polymerization inhibitor, such losses may amount to 100% of the total charge, or in other words, processing in the absence of any inhibitor is completely worthless and well-nigh impossible if it is desired to obtain pure distilled monomer. With many of the well known inhibitors heretofore employed with vinyl type or ethylenically unsaturated monomers such as hydroquinone, p-tertiary butylcatechol and the like, the results are somewhat improved but not sufficiently to render the processes economically feasible. Thus, with tertiary butyl catechol, losses are of the order of 25 to 50% in the pot. Hydroquinone, on the other hand, while a fair inhibitor, contaminates the distilled monomer to the point where, in subsequent polymerization reactions, undesirable color formation occurs. In addition, this particular inhibitor, present as a contaminant, prevents good control of the subsequent polymerization process with many of the desirable polymerization catalysts.

I have discovered that it is possible to process and purify monomers of α-chloroacrylic acid esters employing distillation techniques involving the application of heat to the monomer and at the same time, avoiding any premature polymerization thereof in the pot. In addition, I have discovered that it is possible to obtain an excellently purified monomer product in high yields devoid of any polymerization inhibitor contaminants, thereby insuring the successful attainment of a shaped polymer therefrom in subsequent polymerization processes.

It is therefore an object of my invention to provide a new process whereby monomers of α-chloracrylic acid esters may be processed and handled without premature polymerization thereof.

It is a further object of my invention to provide a process whereby highly purified monomeric acid esters may be prepared devoid of contaminants which interfere with subsequent polymerization thereof.

It is still another object of my invention to provide processes for the distillation of α-chloracrylic acid esters employing heat whereby pot losses due to premature polymerization are minimized.

It is still another object of my invention to provide compositions comprising monomeric esters of α-chloroacrylic acid which exhibit outstanding stability towards polymerization.

It is another object of this invention to provide compositions comprising monomeric esters of α-chloroacrylic acid which exhibit outstanding and unusual stability against polymerization while under the influence of elevated temperatures.

It is a still further object of this invention to provide compositions comprising monomeric esters of α-chloroacrylic acid which exhibit outstanding and unusual stability against polymerization while under the influence of heat radiation.

It is a still further object of this invention to provide compositions comprising esters of α-chloroacrylic acid which are stable against polymerization in the presence of actinic radiation.

Other objects will appear hereinafter as the description proceeds. The objects of this invention are achieved by incorporating into the monomeric α-chloroacrylic acid ester, a 1,4-diamino containing anthraquinone compound. The compounds which are contemplated herein must contain in the 1- and 4-positions, amino groupings, and may contain other substituents in the other substitutable positions. Structurally, the contemplated compounds may be represented as follows:

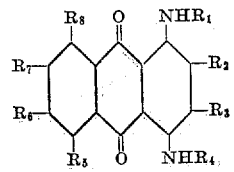

and leuco forms thereof, wherein $R_1$ and $R_4$ may be hydrogen, alkyl, hydroxyalkyl or acyl and $R_2$, $R_3$, $R_5$, $R_6$, $R_7$ and $R_8$ may be amino, substituted amino (for example, alkyl amino, dialkyl amino or acyl amino), halo, nitro, alkyl, alkoxyl, aryloxy, hydroxy, carboxy, carboxamido, carbalkoxy, sulfo, sulfonamido, and substituted sulfonamido such as alkyl sulfonamido and dialkyl sulfonamido. Among the suitable compounds which may be used herein are the following:

1,4-diamino anthraquinone
1,4-bis(methylamino) anthraquinone
1,4-bis(acetylamino) anthraquinone
1,4-bis(propionylamino) anthraquinone
1,4,5-triamino anthraquinone
1,4,5,8-tetraamino anthraquinone
1,4-diamino-2-methoxy anthraquinone
1,4-diamino-5-nitro anthraquinone
1,4-diamino-5-hydroxy anthraquinone
1,4-diamino-5,8-dihydroxy anthraquinone
1,4-bis(methylamino)-5,8-dihydroxy anthraquinone
1,4-bis(ethylamino)-5,8-dihydroxy anthraquinone
1,4-diamino-anthraquinone-2-sulfonic acid
1,4-diamino-2-bromo-anthraquinone
1,4-diamino-2,3-dibromo anthraquinone
1,4-diamino-2,3-dimethoxy anthraquinone
1,4-diamino-2-cyano anthraquinone
1,4-diamino-anthraquinone-2,3-disulfonic acid
1-acetamido-4-amino anthraquinone
1-amino-4-methylamino anthraquinone
1-amino-2-methoxy-4-methylamino anthraquinone
1-butylamino-4-methylamino anthraquinone
1-amino-4-methylamino-2-anthraquinone carboxamide
1,4-diamino-2-phenoxyanthraquinone-3-sulfonic acid
1-(2-hydroxyethylamino)-4-methylamino anthraquinone
1,4-bis(hydroxyethylamino)-anthraquinone The amount of the above described compounds which may be employed as inhibitors in the practice of this invention will vary considerably and is in no way critical. It has, however, been found that amounts from about 0.001% up to about 1% thereof based on the weight of the monomer provide adequate protection to the monomer whereby polymerization is inhibited under the conditions hereinafter to be described.

In order to determine the efficiency of polymerization inhibitors and make a comparison among the various compounds tested for such inhibition characteristics, the following test procedure was employed. Methyl chloracrylate which had been previously vacuum distilled under pre-purified nitrogen and which possessed a freezing point of $-36.26°$ C. was poured into 20 mm. outside diameter test tubes on which had been sealed 10 mm. outside diameter necks. These necks were attached to a 2 in. length of polyvinyl alcohol tubing which could be sealed off with a pinch clamp. The test tube had previously been coated with a solution of polyvinyl alcohol and Congo red. This solution, on drying, deposited a red film over the glass through which observation of the contents of the tube could be made, but which would filter out light of the wave lengths responsible for polymerization. Each of these tubes holds approximately 33 ml. of monomer when filled up to the neck at the point where the polyvinyl alcohol tubing is attached. The compounds to be tested for inhibiting characteristics are weighed into each tube prior to the addition of the monomer and each tube swept with prepurified nitrogen.

After adding the monomer to the tube, the polyvinyl alcohol tubing is pinched shut so that no air may contact the liquid monomer present below the pinch clamp. The tubes are then sealed off and placed on a large mixing wheel which rotates at 3 revolutions per minute. The following heating cycle is employed in the test procedure:

4 days at 20–25° C.
5 hrs. at 50° C.
10 days at 20–25° C.
19 hrs. at 35–40° C.
3 days at 45–50° C.
5 days at 55–60° C.
Remainder of time at 65–70° C.

Each of the tubes on the mixing wheel is observed to determine the time required to gel or to form a non-flowing polymer in the tube while rotating at 3 revolutions per minute. Employing the above described testing procedure, the following materials were used for each 33 ml. of methyl $\alpha$-chloracrylate monomer:

0.04 g. 2-methyl anthraquinone
0.04 g. 2,3-dimethyl anthraquinone
0.04 g. 1-amino-2,3-dimethyl anthraquinone
0.04 g. 1,5-diamino anthraquinone
0.04 g. 1-amino-4-hydroxy anthraquinone
0.04 g. 2-amino anthraquinone
0.04 g. thiourea
0.04 g. copper powder
0.04 g. phenol
0.04 g. p-tertiary butyl catechol
0.04 g. sulfur The pure monomer with no added inhibitor was found to require 28 days to gel in the above described test procedure. The monomer containing copper powder gelled in 3 days 4 hrs., those containing the 1,5-diamino anthraquinone and 2-methyl anthraquinone in 10 days, those containing the 1-amino-4-hydroxy anthraquinone, the 2,3-dimethyl anthraquinone, the 1-amino-2,3-dimethyl anthraquinone, and the thiourea in less than 20 days, and with phenol and 2-amino anthraquinone in 27 days. Each of these materials, thus, it will be observed, while heretofore described as vinyl type polymerization inhibitors, actually, with the monomers contemplated in this invention, instead of being inhibitors of the polymerization reaction, appeared to catalyze it. The p-tertiary butyl catechol, on the other hand, and sulfur gave somewhat better results, the former requiring 32 days and the latter 28 days. The same procedure employing 0.04 g. of the compounds of this invention do not produce any gelling from about 50 to 120 days. It will thus be observed that each of the compounds contemplated herein is an excellent inhibitor for the monomers of $\alpha$-chloroacrylic acid esters and unexpectedly superior to other substituted anthraquinones lacking a 1,4-diamino substituent. In addition, these compounds are far superior to innumerable others which have heretofore been considered satisfactory inhibitors for vinyl or ethylenically unsaturated monomers.

The following examples will serve to illustrate the unexpected and outstanding benefits to be derived from the use of the inhibitors of this invention which have been described above.

*Example 1*

A charge of 1000 ml. of methyl-$\alpha$-chloroacrylate (characterized by having a freezing point of $-37.20°$ C.) and 1.2 g. of 1-amino-4-methylamino anthraquinone is placed in a flask provided with a distillation column. The system is swept and maintained under nitrogen to provide an inert atmosphere. The still is then placed into operation under a vacuum of 30 mm. of mercury employing pot temperatures during the distillation ranging from about 58 to 63° C. The recovery of purified monomer amounts to 967 ml. and this product has a freezing point of −36.67° C., which represents a product having a purity of better than 99%.

Example 2

The procedure of Example 1 is repeated except that the inhibitor employed is p-tertiary butyl catechol in the same amounts. Recovery from this procedure is 571 ml. of monomer having a freezing point of −36.77° C.

Example 3

The procedure of Example 1 is again repeated with two separate charges of methyl-α-chloroacrylate monomer employing, however, in one 0.12 g. of inhibitor per liter of monomer, and in the second case 12.0 g. of inhibitor per liter of monomer. In the first case, recovery amounts to 961 ml. of pure monomer and in the second case, 973 ml. of pure monomer, which recoveries represent in these experiments 96 to 98%.

Example 4

To a charge of 1000 ml. of methyl-α-chloroacrylate contained in a flask there are added 1.0 g. of the inhibitor used in Example 1 and 0.4 g. of chloranil. The latter compound is employed to inhibit and reduce the tendency for the subject monomer to polymerize outside of the still pot, and especially where the monomer is subjected to elevated temperatures for long periods of time, such as in an extended reflux operation. The use of chloranil for such purposes is fully described in my copending application Serial No. 649,305, filed March 29, 1957. In this experiment the monomer employed has a freezing point of −37.15° C. The flask, after charging, is provided with a packed column of 30 in. in height and then the entire system is swept and subsequently maintained under nitrogen. Distillation is then carried out under a vacuum of 30 mm. of mercury employing a pot temperature ranging from about 59 to 62° C. The take-off from the reflux column is adjusted so that the total reflux time is 12 hrs. At the end of this period of time there is recovered 986 ml. of highly purified methyl-α-chloroacrylate monomer which has a freezing point of −36.48° C. This procedure demonstrates the increased efficiency of distillation and yield of monomer wherein advantage is taken of the inhibiting characteristics of chloranil in the still column. Since an efficient fractionation employing such reflux columns makes possible the recovery of a more highly purified monomer product, it is desirable to operate in this manner and therefore it is advisable to employ the additional inhibitor which gives protection against polymerization outside of the still pot.

Eample 5

The procedure of Example 1 is again repeated employing hydroquinone as the inhibitor. In this case, only 610 ml. of purified monomer is recoverable from the original charge of 1 liter. The residue in the still pot is substantially fully polymerized monomer.

Example 6

The procedure of Example 4 is repeated except that the only inhibitor employed is hydroquinone in the amount of 2.4 g. After 4 hrs. operation, there is recovered 228 ml. of purified monomer. At this time the contents of the flask have become very viscous, indicating substantial polymerization of the contents. In addition, the reflux column is beginning to plug up with polymer product.

Example 7

The procedure of Example 1 is again repeated employing as the inhibitor 1.2 g. of 1,4-bis(methylamino) anthraquinone. The recovery in this case amounts to 960 ml. of monomer.

Example 8

The procedure of Example 1 is again repeated using as the inhibitor 1,4-diamino anthraquinone. Excellent recovery is achieved, amounting to 959 ml.

Example 9

The procedure of Example 1 is once again repeated using as the inhibitor 1.2 g. of 1,4-diamino-2-methoxy anthraquinone. Excellent recovery of monomer is obtained.

Examples 10–12

Repeating the procedure of Example 1 employing as inhibitors, however, with different batches of monomer, 1,4-diamino-5-nitro anthraquinone, 1,4,5,8-tetraamino anthraquinone, and 1,4-diamino-5,8-dihydroxy anthraquinone, results in each instance in an excellent recovery of better than 95% of the original charge of a highly purilled monomer characterized by a purity of better than 99.5%.

Example 13

The procedure of Example 1 is repeated employing 1.2 g. of 1,5-diamino anthraquinone. Recovery amounts to only 410 ml. of monomer and the remaining contents of the still pot are completely set up.

Example 14

The procedure of Example 4 is repeated employing as the inhibiting compounds 1-amino-4-hydroxy anthraquinone on the one hand and with a second charge of 1-amino-2,3-dimethyl anthraquinone. In each case, less than 300 ml. of monomer is recoverable, the remainder being completely set up in the still pot, and also in each case polymer plugs being evident in the fractionation column, requiring shutdown.

The above examples demonstrate not only the outstanding and improved inhibiting characteristics of the compounds with which this invention is concerned, but they also demonstrate that similar compounds not encompassed herein and which showed up poorly in the test procedure described above for evaluating inhibitors, were equally poor in actual practice.

While the invention has been described in the specific examples in connection with methyl-α-chloroacrylate, it is also applicable to other α-halogen substituted acrylic compounds. Thus, in addition to the alkyl esters of α-chloroacrylic acid such as ethyl, propyl, butyl esters and other aliphatic and aromatic esters such as phenyl, benzyl, cyclohexyl, allyl, methallyl, and the like, the corresponding α-bromo and α-fluoro acrylic acid esters may be employed. Also, the polyhydric alcohol esters such as the glycol di-α-chloroacrylate may be used.

Variations and modifications which will be obvious and apparent to those skilled in the art may be made in the procedure above described without departing from the scope and spirit of my invention.

I claim:

1. A composition comprising a liquid monomeric α-haloacrylic acid ester of an alcohol and a polymerizing inhibiting amount of a 1,4-diamino containing anthraquinone compound.

2. A composition comprising a liquid lower alkyl ester of α-chloroacrylic acid and a polymerizing inhibiting amount of a 1,4-diamino anthraquinone compound.

3. A composition comprising a monomeric methyl-α-chloroacrylate and a polymerization inhibiting amount of a 1,4-diamino containing anthraquinone compound.

4. A composition comprising a monomeric methyl-α-chloroacrylate and at least about 0.001% by weight based on the weight of the said monomer of a 1,4-diamino anthraquinone compound.

5. A composition as defined in claim 4 wherein the anthraquinone compound is 1,4-diamino anthraquinone.

6. A composition as defined in claim 4 wherein the anthraquinone compound is 1-amino-4-methylamino anthraquinone.

7. A composition as defined in claim 4 wherein the anthraquinone compound is 1,4-bis(methylamino) anthraquinone.

8. A composition as defined in claim 4 wherein the anthraquinone compound is 1,4-diamino-5-nitro anthraquinone.

9. A composition as defined in claim 4 wherein the anthraquinone compound is 1,4-diamino-5,8-dihydroxy anthraquinone.

10. A process for inhibiting the polymerization of a liquid α-haloacrylic acid ester which comprises incorporating therewith a 1,4-diamino containing anthraquinone.

11. A process for inhibiting the polymerization of monomeric methyl-α-chloroacrylate which comprises incorporating therewith about 0.001% to about 1% by weight based on the weight of the monomer of a 1,4-diamino containing anthraquinone.

12. A process for inhibiting the polymerization of monomeric methyl-α-chloroacrylate which comprises adding thereto about 0.1% by weight based on the weight of the monomer of a methylated 1,4-amino containing anthraquinone compound.

13. A process for inhibiting the polymerization of monomeric methyl-α-chloroacrylate which comprises adding thereto about 0.1% by weight based on the weight of the monomer of 1-amino-4-methylamino anthraquinone.

14. A process for inhibiting the polymerization of monomeric methyl-α-chloroacrylate which comprises adding thereto about 0.1% by weight based on the weight of the monomer of 1,4-bis(methylamino)anthraquinone.

15. In a process where monomeric methyl-α-chloroacrylate is subjected to elevated temperatures, the step of inhibiting polymerization by the presence of a 1,4-diamino containing anthraquinone in contact with the ester.

16. A process for purifying methyl-α-chloroacrylate which comprises distilling said ester in the presence of a polymerization inhibiting amount of a 1,4-diamino anthraquinone compound in contact with the ester.

17. In the distillation of methyl-α-chloroacrylate, the improvement which comprises conducting said distillation in the presence of a polymerization inhibiting amount of 1,4-diamino containing anthraquinone compound in contact with the ester.

18. In the distillation of monomeric methyl-α-chloroacrylate, the improvement which comprises conducting the distillation in the presence of about 0.1% by weight based on the weight of the monomer of a methylated 1,4-diamino containing anthraquinone in contact with the ester.

19. A process for purifying a liquid monomeric α-haloacrylic acid ester which comprises distilling said ester in the presence of a polymerization inhibiting amount of a 1,4-diaminoanthraquinone compound in contact with the ester.

20. In the distillation of liquid monomeric α-haloacrylic acid ester, the improvement which comprises conducting said distillation in the presence of a polymerization inhibiting amount of 1,4-diamino containing anthraquinone compound in contact with the ester.

References Cited in the file of this patent

UNITED STATES PATENTS

| | | |
|---|---|---|
| 2,233,835 | Crawford et al. | Mar. 4, 1941 |
| 2,241,770 | Dreisback et al. | May 13, 1941 |
| 2,388,041 | Craig | Oct. 30, 1945 |
| 2,399,340 | Franz | Apr. 30, 1946 |
| 2,407,861 | Wolk | Sept. 17, 1946 |
| 2,476,528 | Barnes | July 19, 1949 |
| 2,694,726 | Anspon | Nov. 16, 1954 |
| 2,704,770 | Anspon | Mar. 22, 1955 |

FOREIGN PATENTS

| | | |
|---|---|---|
| 528,761 | Great Britain | Nov. 6, 1940 |
| 750,358 | Great Britain | June 13, 1956 |